US011089807B2

(12) United States Patent
Asensio Camacho et al.

(10) Patent No.: US 11,089,807 B2
(45) Date of Patent: Aug. 17, 2021

(54) JUICING UNIT HAVING A SUPPORT

(71) Applicant: ZUMEX GROUP, S.A., Moncada (ES)

(72) Inventors: Ramon Asensio Camacho, Valencia (ES); Fernardo Casani Montaner, Riba-roja del Turia (ES); Maximilia Marti Soler, Paterna (ES); Juan Carlos Coronado Sanz, Barcelona (ES)

(73) Assignee: ZUMEX GROUP, S.A., Valencia (ES)

( * ) Notice: Subject to any disclaimer, the term of this patent is extended or adjusted under 35 U.S.C. 154(b) by 313 days.

(21) Appl. No.: 16/303,173

(22) PCT Filed: May 22, 2017

(86) PCT No.: PCT/EP2017/062292
§ 371 (c)(1),
(2) Date: Nov. 20, 2018

(87) PCT Pub. No.: WO2017/202780
PCT Pub. Date: Nov. 30, 2017

(65) Prior Publication Data
US 2020/0323252 A1    Oct. 15, 2020

(30) Foreign Application Priority Data

May 23, 2016    (ES) ............................... ES201630663

(51) Int. Cl.
*A47J 19/02*    (2006.01)
*A23N 1/02*    (2006.01)
*A23N 1/00*    (2006.01)

(52) U.S. Cl.
CPC .............. *A23N 1/02* (2013.01); *A23N 1/003* (2013.01); *A47J 19/023* (2018.08); *A47J 19/02* (2013.01)

(58) Field of Classification Search
CPC .......... A47J 19/02; A47J 19/023; A47J 19/06; A23N 1/003; A23N 1/00
(Continued)

(56) References Cited

U.S. PATENT DOCUMENTS 2,270,007 A * 1/1942 McKinnis .............. A23N 1/003
99/507
5,170,699 A * 12/1992 Senalada ................ A23N 1/003
99/504

(Continued)

FOREIGN PATENT DOCUMENTS

| CN | 103405131 | 11/2013 |
|---|---|---|
| EP | 0728423 | 8/1996 |
| EP | 2412252 | 2/2012 |

OTHER PUBLICATIONS

International Search report corresponding to International Application No. PCT/EP2017/062292 dated Aug. 7, 2017; 3 pages.

*Primary Examiner* — Reginald Alexander
(74) *Attorney, Agent, or Firm* — Vedder Price P.C.

(57) ABSTRACT

Juicing unit having a support for an automatic juicing machine of the type in which the juicing unit comprises one or more female drums that move synchronously with one or more male drums that allows easy removal of the juicing unit as a whole for cleaning, such that the support comprises two plates with different openings that sandwich between them the main elements of the juicing unit such as the male and female drums, both plates being joined by at least one removable rod that is fastened via an anchor that allows a strong coupling and easy opening, such plates additionally comprising elements for anchoring to other elements of the juicing unit as well as elements for anchoring to the main body of the juicing machine.

6 Claims, 4 Drawing Sheets

(58) Field of Classification Search
 USPC .......................................... 99/506, 507, 349
 See application file for complete search history.

(56) References Cited

U.S. PATENT DOCUMENTS

| 10,881,128 B2* | 1/2021 | Flotats Molinas ..... A23N 1/003 |
| 2012/0024172 A1* | 2/2012 | Pichler .................... A23N 1/02 |
| | | 100/96 |

* cited by examiner

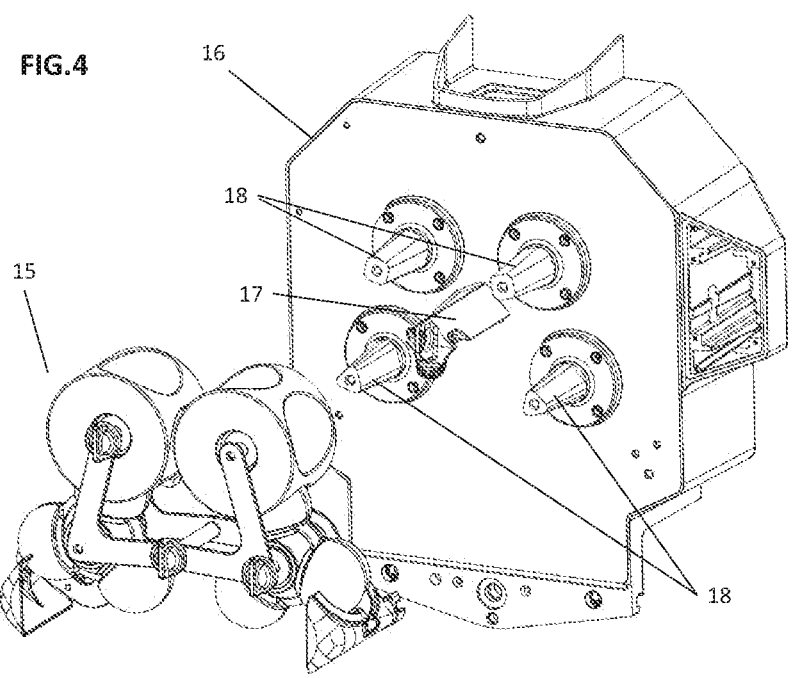

JUICING UNIT HAVING A SUPPORT

The invention, as indicated in the title, relates to a sandwich type support for a juicing unit for an automatic juicing machine of the type in which the juicing unit comprises one or more female drums, preferably two, with a synchronous but reverse movement with one or more, preferably two, male drums, wedges associated to the male drums to extract the peels, and a cutting blade; where the female drums have suitable cavities to house the fruit or vegetable or part thereof and carry it to the cutting blade where the fruit is to be sectioned, then continuing its path until it meets one of the projections in the male drum, and which is squeezed into the cavity causing the juicing, the peel normally remaining adhered to the projection of the male drum until extracted by the associated wedge.

The support proposed allows the easy extraction of the juicing unit in a single block in order to facilitate its cleaning, all this notwithstanding that each of its elements may also be disassembled for maintenance operations or more in-depth cleaning.

The corresponding field of the art is that of machines for preparing drinks.

BACKGROUND

Automatic juicers comprising drive elements that engage juicing elements have been known for a long time.

Due to the characteristics of juice, particularly citrus fruit juice, these machines require frequent cleaning and care to prevent malfunctions as well as for hygiene reasons.

Thus, the various individual elements forming the juicing unit must be removed from the machine for cleaning operations.

In order to facilitate the disassembly of the several individual elements that form the juicing unit, it is common to use knobs that with a small turn fasten or release the different elements of the juicing units.

To solve the aforementioned problem, patent ES2389890T3 describes an extraction lock comprising an element that acts as a stop for the juicing drums, where said stop is removably attached directly to the frame.

Said patent simplifies the tasks of fastening or releasing the male or female drums of the juicing unit, since it comprises a stop all the drums such that by fastening said stop all the drums are fastened and by removing it all the drums are released for removal.

However this does not solve the problem of providing a support for all elements such that they can be handled as a whole; instead, once the stop is released, each element of the juicing unit must be removed individually, drum by drum, slowing down cleaning operations and increasing the likelihood of losing one of the drums.

Patent ES2475147 relates to a juicing machine of those comprising male and female drums, where in order to simplify the cleaning tasks a removable wall is provided to separate the juicing area from the machine frame. This removable wall coinciding with the juicing area prevents the frame from getting dirty.

However, the problem of the complex assembly and removal operations is not solved, since as indicated in the specification the cleaning operations require first removing the case and collector tray from the frame before removing the press rollers and the heads of the punch, as well as the sliding guide for the fruits cut in half, and the scraper elements can be removed after being separated from the support. Next the rear wall can be separated from the axles with the guide and spool for the blade, such that the spool can be moved outwards from the guide. The operation is performed in the inverse order to assemble the cleaned parts.

Spanish patent P201431535, also by the same applicant, relates to a casing for a juicing machine that provides a support for the different elements of the juicing unit as well as the auxiliary elements thereof, allowing the handling of all such elements as a unit, but it does not however entirely solve the problem stated since, although it allows handling the elements as a unit, since all the elements lie within the casing that provides them support, they cannot be cleaned effectively unless extracted from it.

The European Patent Application EP7028423, as well as the Chinese Application CN103405131 describe a citrus juicer having two horizontal platforms and two drums, one inside the other but not concentrical, moved by vertical axis. In that document the upper platform is able to be removed in order to access to the drums to clean them, but it does not allow to handle as a unit all the elements of the juicing unit.

The European Patent Application EP2412252 refers a juicer comprising male and female drums in a pressing chamber whereas that pressing chamber comprises a rear wall detachably fastened to the frame, but it does not allow to handle as a unit all the elements of the juicing unit.

The present invention intends to prevent the assembly and removal of each part separately, proposing a robust support to link all the elements of the juicing unit such that they can all be assembled and removed as a unit.

DESCRIPTION OF THE INVENTION

In order to solve the problems stated and to allow the easy assembly and disassembly of the juicing unit as a whole for cleaning, the invention proposed relates to a support that comprises two plates with different recesses that sandwich between them the main elements of the juicing unit such as the male and female drums, both plates being joined by at least one removable rod that is fastened via an anchor that allows a strong coupling and easy opening such as a threaded system with a knob.

This support also comprises anchoring elements for secondary elements of the juicing unit such as the extracting wedges or the cutting blade.

The assembly formed by the support and the different elements of the juicing unit is anchored to the body of the machine via a series of anchoring means, amongst which we propose the threading of at least two of the shafts of the drums, such as for example the lower horizontal shafts.

The connection between the unit comprising the support and the juicing unit and the machine must be solid and allow easy opening, for which reason we propose the use of threads with handling knobs, without disregarding other possible anchoring types such as clips or even magnetic systems.

The plates comprising the support have the following features:

The front vertical plate has a series of openings that are suitable to house the fastening screws for the drums as well as the fastening screws for the rod that joins both plates.

This front plate may have different shapes, as an "H", "U", "C" or sideways H, inverted U or inverted C, among others, the essential factor being that it covers the ends of the rotation shafts of the drums.

Other possible shapes that are less preferred are, among others, an "O" shape in which there would be an excess of useless material or an "X" shape where the problem would be in occupying the central space, thus making it difficult to house or access the cutting blade of the machine.

In any case the main characteristic of this front sheet is that it covers all the outer ends of the rotation shafts of the drums.

In order to aid comprehension we shall explain the invention considering that we have chosen the "U" shape without this implying that we reject any other shape.

The inner part of the "U" remains free, in the air, providing easy access both visual and physical, to the cutting blade, allowing monitoring the cutting operations of the fruit or the extraction of the blade without requiring disassembly of the juicing unit.

As well as the advantages stated, the "U" configuration are entails considerable saving in materials and manufacture, as well as less weight, which is especially interesting since said plate is supported by the ends of the rotation shafts of the drums and therefore a heavy plate may compromise the proper operation thereof.

The rear vertical plate comprises a series of peripheral openings that are suitable to allow passage of the rotation shafts of the drums and to directly or indirectly adjust to the base of these, and may comprise at least one more central opening the size and shape of which will vary according to whether the cutting blade is attached directly to the body of the juicing machine or whether it is in contrast attached to the support, since in the first case the central opening must a sufficiently large as to allow passage of the cutting blade whereas in the second case, the central opening may be limited to allowing passage of the drive elements of the blade. In the case of a fixed cutting blade attached exclusively to the support, said central opening may not exist.

In the proposed embodiment shown in the figures, the cutting blade is attached to the body of the machine and the peripheral openings are circular in shape, although this is not the only possible embodiment since it may have any shape and size as long as it allows passage of the rotation shafts of the drums and allows direct or indirect fastening to the base of these.

The rear plate may have an offset if necessary to correct for the different widths of the drums.

In any of the two plates there may be an anchoring area for the extracting wedges; however, the invention is not conditioned or limited to the existence or not of this area since the extracting wedges, as the cutting blade, may be attached to the support or attached directly to the body of the machine.

In order to join both plates a rod is provided that runs preferably in parallel to the shafts of the drums and that attaches both plates.

The fastening of said rod to the plates may be of any type that ensures a strong attachment and allows easy release, having chosen for a preferred embodiment a union by a compressive thread with a knob for easy handling with the bare hands without requiring tools.

In one possible embodiment, the rod is attached to the rear plate via means that do not allow removal, such as welding, whereas the attachment to the front plate is made by removable means; however, there may be variations and both attachments or only the attachment to the rear plate may be removable, all these options being protected by this invention.

The assembly also comprises suitable bearings to house the outer ends of the rotation shafts of the drums, thus favouring the robustness of the assembly without detriment of the rotation conditions for the drums.

The anchoring of the support and the juicing unit to the body of the machine is made via anchoring means that ensure a solid fastening and easy opening, having chosen for one possible embodiment an attachment by a compressive thread with a knob for easy handling with bare hands without requiring tools.

In one embodiment the attachment means for the support to the body of the machine are complementary with other attachment means existing on the ends of the rotation shafts of at least two of the drums, these being preferably the rotation shafts for the drums that are, for example, in the lower parallel position, although there may be other configurations.

Regarding the materials in which to manufacture the support, there is no limitation other than that imposed by regulations since said support is intended for use in a machine for preparing food. Preferably it will be carried out in a stiff material, but it may also be carried out in flexible material.

BRIEF DESCRIPTION OF THE DRAWINGS

For better comprehension of the invention, the following figures are shown by way of illustration and in a non-limiting sense.

Figure 1:
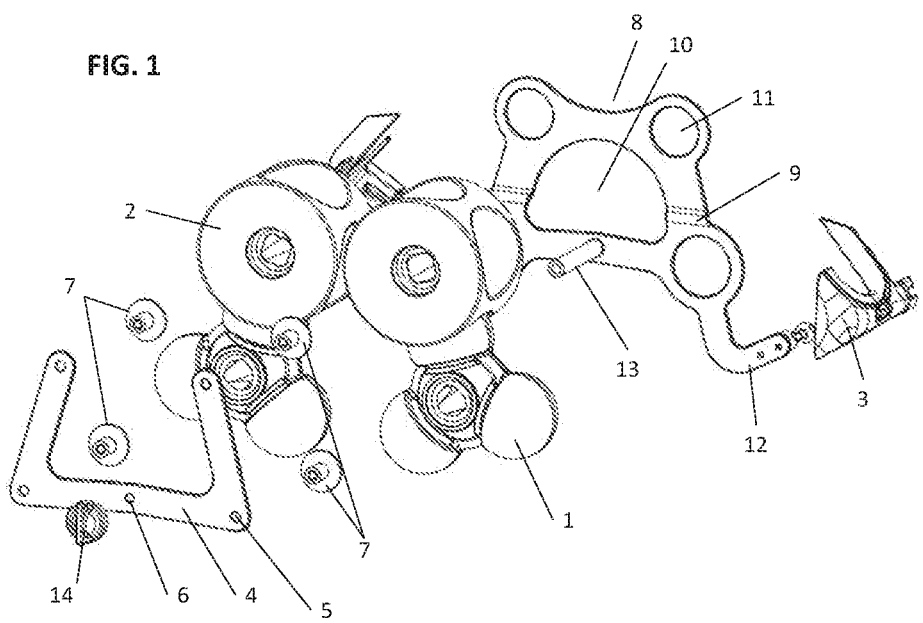
FIG. 1 shows an exploded view of the different components of the support accompanied the elements of the juicing unit for better comprehension, and thus we can see.

The male drums (1), the female drums (2) and the extracting wedges (3) as elements of the juicing unit.

The U-shaped front vertical plate (4) with a series of openings of which one will be the opening (6) for the rod (13) and the rest of the housings (5) for the bearings (7) that will house the rotation shafts for the drums.

The rear vertical plate (8) has an offset in its waist (9), a central opening (10) and peripheral openings (11), also having elongations (12) in its lower part on which the extracting wedges (3) are anchored.

Figure 2:
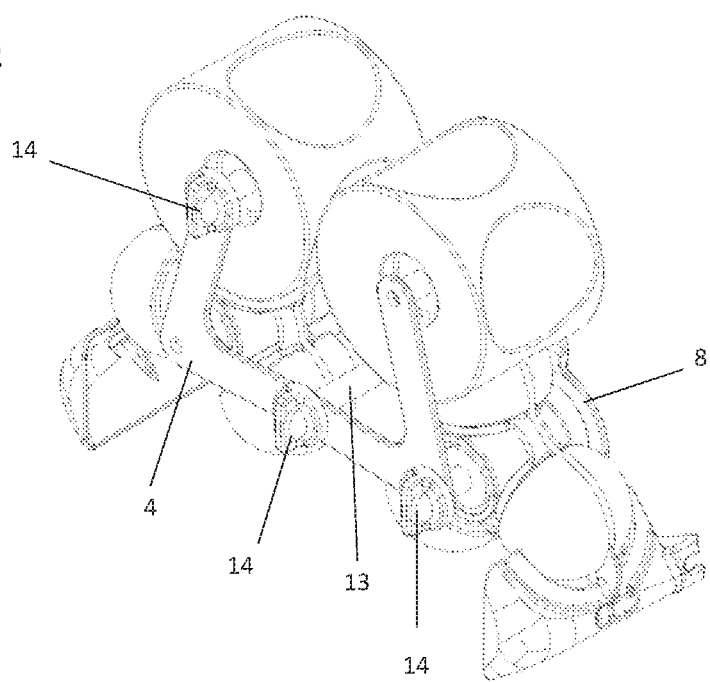

FIG. 2 shows the assembly when mounted, showing the rod (13) that joins the front plate (4) and the rear plate (8) and the knobs (14) that are part of the anchoring elements.

Figure 3:
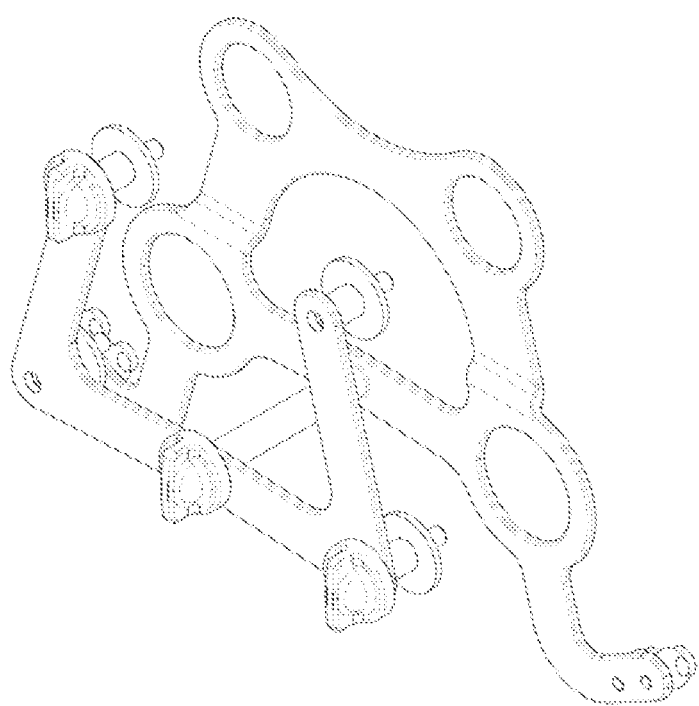

FIG. 3 shows the support without the elements of the juicing unit.

FIG. 4 shows an exploded view of the juicing machine showing on one side the juicing unit as a unit with the support (15) and on the other side the body of the juicing machine (16) showing the cutting blade (17) attached to the same and the rotation shafts of the drums (18).

DESCRIPTION OF AN EMBODIMENT OF THE INVENTION

A non-limiting embodiment of the invention is described below for illustration purposes only.

The invention relates to a sandwich type support to house the juicing unit of an automatic juicing machine of the type that has male drums and female drums and allow its assembly, disassembly and handling as a unit, thus facilitating maintenance and cleaning tasks.

The support comprises:

A U-shaped front plate (4) such that this plate in its path covers the ends of the rotation shafts of the drums, having a series of housing openings (5) for fastening the bearings (7) as well as an opening (6) for fastening the rod (13) that joins the front plate (4) to the rear plate (8), this rod (13) being welded to the rear plate (8).

The rear plate (8) has a series of openings, of which one is central (10) and others peripheral (11), wherein the central opening, which in this case is larger, allows passage of the cutting blade and the peripheral openings allow passage of the rotation shafts of the drums and are attached to the base.

The rear plate (8) has an offset in its waist thus generating two different planes, the top part of said plate being slightly offset regarding the bottom part thereof correcting for the different width of the male and female drums.

In the lower section of the rear plate is the anchoring area for the extracting wedges (3), in this case two elongations (12) that extend laterally outwards and that are suitable for fixing the extracting wedges (3) thereto.

The support houses between both plates (4) and (8) the elements of the juicing unit such as the male drums (1), the female drums (2) and the extracting wedges (3), thus allowing its assembly and disassembly as a unit for cleaning operations on the machine.

The assembly is attached via the rod (13) that attaches the front plate (4) to the rear plate (8), said rod being fastened via a thread that incorporates a safety knob for easy opening and closing without requiring tools.

The attachment of the juicing unit and the support to the rest of the machine is carried out via anchoring means arranged on the ends of the shafts of two of the drums, showing here, as an example, the anchoring means on the shafts crossed diagonally and on the top left and bottom right shafts, with other configurations being possible.

The support also comprises a series of bearings (7) that coincide with the rotation ends of the drums and are suitable for association to such rotation shafts, thus facilitating the attachment and rotation of them all.

The juicing unit thus assembled on the support can be disassembled from the juicing machine only by loosening and releasing the anchors of the two rotation shafts involved (in this case top left and bottom right).

The assembly can be handled as a unit since the elements of the juicing unit (male drums (1) and female drums (3) and extracting wedges (3)) are sandwiched between the front plate (4) and the rear plate (8) and both plates are joined via a removable rod (13).

Should more in-depth maintenance or cleaning operations be required it shall suffice to release the rod in order to extract each of the juicing elements individually.

The invention claimed is:

1. A JUICING UNIT comprising: one or more female drums, with a synchronous but reverse movement with one or more male drums, wedges disposed adjacent to the male drums to extract a peel of a fruit, and a cutting blade; where a rotation shaft for each of the male and female drums is disposed in a horizontal orientation and where the female drums carry the fruit to the cutting blade where the fruit is sectioned, then continuing along a path until the fruit contacts a projection in one of the male drums, and is squeezed into a cavity defined in one of the female drums thereby causing the juicing, wherein the peel adhered to the projection of the male drum is extracted by the wedge; a support that comprises a vertical front plate (4) and a vertical rear plate (8) that are removably attached by at least one rod (13), wherein the front plate includes a plurality of housings (5) and an opening (6) for each rod and covers an outer edge of the rotation shafts of the drums, and wherein the rear plate (8) comprises peripheral openings (11), each configured to accommodate a base of one of the drums, such that the male (1) and female (2) drums are cooperatively retained between the front plate (4) and the rear plate (8) to define an assembly that is handled as a unit, wherein said assembly is connected by fastening means to a body of the juicing unit, and wherein such fastening means are removable.

2. The JUICING UNIT according to claim 1 wherein the rear plate further comprises a central opening.

3. The JUICING UNIT according to claim 1 further comprising elongations (12) on which the wedges (3) are anchored.

4. The JUICING UNIT according to claim 1 further comprising a plurality of bearings (7) disposed on an end of each of the rotation shafts.

5. The JUICING UNIT according to claim 1 wherein the peripheral openings (11) of the rear plate (8) are disposed about a base of the rotation shafts.

6. The JUICING UNIT according to claim 1 wherein the rear plate has an offset (9) disposed between an upper peripheral opening and a lower peripheral opening such that an upper part of the rear plate is disposed offset and further back than a lower part of the rear plate.

* * * * *